Sept. 10, 1968        F. C. HUTTO        3,400,941

PISTON RING ASSEMBLY

Filed May 24, 1967        3 Sheets-Sheet 1

FRANK C. HUTTO
INVENTOR

BY John R. Faulkner
Robert E. McCollum
ATTORNEYS

Sept. 10, 1968  F. C. HUTTO  3,400,941
PISTON RING ASSEMBLY
Filed May 24, 1967  3 Sheets-Sheet 2

FRANK C. HUTTO
INVENTOR

BY John R. Faulkner
Robert E. McCollum
ATTORNEYS

Sept. 10, 1968     F. C. HUTTO     3,400,941

PISTON RING ASSEMBLY

Filed May 24, 1967     3 Sheets-Sheet 3

FRANK C. HUTTO
INVENTOR

BY John A. Faulkner
Robert E. McCallum
ATTORNEYS

United States Patent Office 3,400,941
Patented Sept. 10, 1968

3,400,941
PISTON RING ASSEMBLY
Frank C. Hutto, Dearborn, Mich., assignor to Ford Motor Company, Dearborn, Mich., a corporation of Delaware
Filed May 24, 1967, Ser. No. 641,044
16 Claims. (Cl. 277—123)

ABSTRACT OF THE DISCLOSURE

A multiple element, single groove, combination compression and oil control piston ring assembly having a number of radially inwardly extending annular tongues extending into a number of corresponding annular recesses in the base of the ring groove. The tongues of the piston ring elements overlie the sides of the annular recesses in the piston groove forming seals which prevent losses of compression around the rear portions of the piston ring elements; and, of which the following is a specification:

Background of the invention

Internal combustion engines commonly employ two different types of piston rings—compression rings and oil control rings. These rings often appear in separate grooves in the piston. Such construction requires a considerably larger ring belt than does the invention as described in the following paragraphs.

Minimum ring belt distance is often desired to reduce piston height to achieve a low compression ratio or a low engine profile. A method to reduce the piston ring belt distance is to use a single groove combination compression and oil control piston ring assembly. Two examples of such piston rings are shown by Patent Nos. 3,000,678 and 3,024,029. Because the upper elements of these piston ring assemblies are only partially enclosed by a ring groove these piston ring assemblies commonly experience compression losses around the radial inward parts of the elements and must generally be used in combination with an additional groove and compression ring. It may be noted, however, that whenever more than one ring groove is used, ring belt distance is substantially increased.

Brief summary of the invention

This invention provides a combination compression oil control piston ring assembly which reduces ring belt distance and is adequate to operate independently as a single groove piston ring assembly.

It further provides a piston ring construction which greatly reduces compression loss around the inner, as well as outer, parts of the compression ring elements.

The invention provides a multiple recess piston ring groove working in cooperation with multiple radially inwardly extending portions of stacked piston ring assembly elements so as to form a labyrinthian seal against compression loss.

The invention also provides a series of pressure sealing elements having their axial sides in continuous contact to prevent compression loss between rings. The invention provides a combination compression and oil control piston ring assembly that has axial flexibility to compensate for ring groove waviness, that substantially reduces ring groove pound-in, and that functions as a one-way valve to permit oil return.

Certain embodiments of the invention provide a piston ring assembly having a radially outwardly biased element with a beveled face that wedges a second element radially outwardly and axially away from the biased element.

Finally, this invention provides a piston ring assembly cooperating with a piston ring groove having at least two inwardly extending annular recesses providing a plurality of upwardly facing annular shelves, the piston ring assembly having a plurality of pressure sealing elements axially abutting each other and having substantially continuous annular contact at an axial side with an adjacent pressure sealing element, at least two of the pressure sealing elements having outer faces slidably engaging the cylinder bore, at least two of the pressure sealing elements having inwardly extending annular portions which project into the recesses and overlie the shelves formed by the recesses, the piston ring assembly forming a combination oil control and compression ring assembly having a multiple element, labyrinthian seal to minimize loss of compression pressure around the radially inner surfaces of the pressure sealing elements.

Other objects and features of the invention will become apparent upon reference to the detailed description thereof and to the accompanying drawings.

Detailed description

Figure 1:
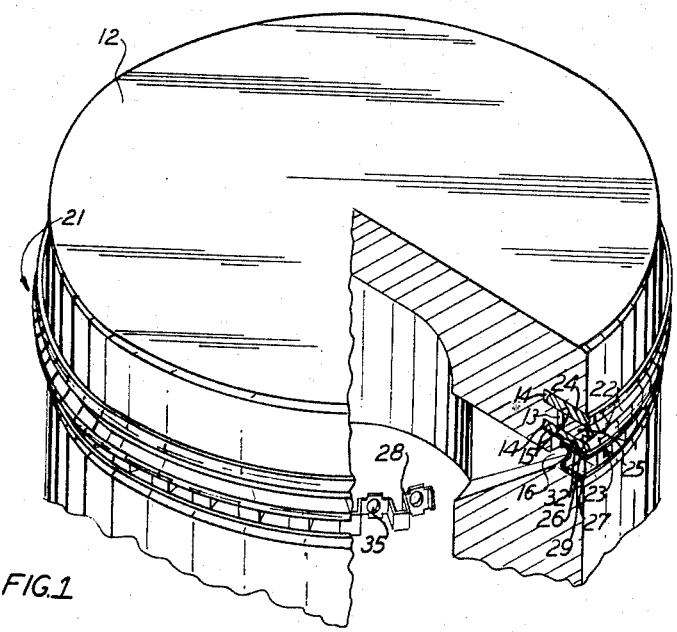
FIGURE 1 is a perspective view, with parts broken away and in section, of a piston and piston ring assembly embodying the invention. Likewise

Common to each embodiment of the invention is a portion 10 of an internal combustion engine cylinder block formed with a bore 11 that slidably receives piston 12. Piston 12 is formed with a ring groove 13 into which is inserted one of the several piston ring assemblies—21, 41, 61, 81 or 101—described below. A plurality of radially inwardly extending annular recesses 14 are formed in ring groove 13 to provide upwardly facing shelves 15. A series of oil returns 16 lead from the lower axial side of ring groove 13 to the interior of piston 12, which is hollow.

Figure 2:
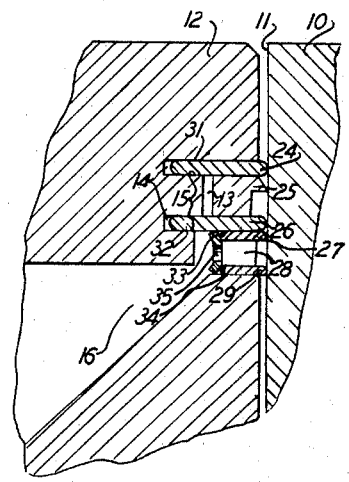
FIGURE 2 is an enlarged cross-sectional view of portions of an engine cylinder block and a piston and piston ring assembly embodying the invention. Similarly.

FIGURES 1 and 2 illustrate one embodiment of the invention. Piston ring assembly 21, received in ring groove 13, comprises a pressure sealing assembly, shown generally at 22, and an oil control assembly, shown generally at 23. It is to be understood that pressure sealing assembly 22 may have a secondary function of oil control and oil control assembly 23 may have a secondary function of compression sealing. The pressure sealing assembly 22 includes rail elements 24 and 26 and compression element 25.

Rail elements 24 and 26, preferably made of steel and of a conventional split rail construction, are biased to bear against bore 11. Radially inward portions 31 and 32 extend into annular recesses 14 and overlie shelves 15.

Compression element 25, preferably made of cast iron and of a conventional split ring construction, axially interposes rail elements 24 and 26 and bears against cylinder bore 11.

Axially downward from pressure sealing assembly 22 is oil control assembly 23, comprising oil control rails 27 and 29 and expander-spacer 28 intermediate thereto. Expander-spacer 28 is biased radially outwardly and engages the inner peripheries of oil control rails 27 and 29 along an upper and lower series of radially inwardly slanted fingers 33 and 34, respectively. A series of holes 35 permit passage of oil through expander-spacer 28 into oil returns 16.

During the engine compression stroke, compression pressure and cylinder bore friction urge the piston ring assembly elements axially downwardly causing side sealing of rail elements 24 and 26 against annular shelves 15 and against adjacent elements. Furthermore, rail elements 24 and 26 and compression element 25, in combination, form a labyrinthian seal to prevent compression loss around the radially inner surfaces of the pressure sealing assembly 22.

The radially outward bias of expander-spacer 28 operating against the inner peripheries of oil control rails 27 and 29 through inwardly slanted fingers 33 and 34 produces a corresponding axial bias tending to wedge apart rails 27 and 29. As piston 12 descends during power or intake strokes the oil control elements 23 compress and oil control rail 29 moves slightly away from the lower side of ring groove 13 to permit oil to pass between enroute to oil return 16. Oil remaining is stripped from bore 11 by oil control rail 27 and passes through holes 35 enroute to oil return 16.

Expander-spacer 28 may be fabricated from a strip of sheet metal that has a series of punched holes 35 with a corresponding series of fingers 33 and 34 positioned above and below holes 35. The strip is bent as illustrated in FIGURE 1 and forms the spacer for rails 27 and 29.

Figure 3:
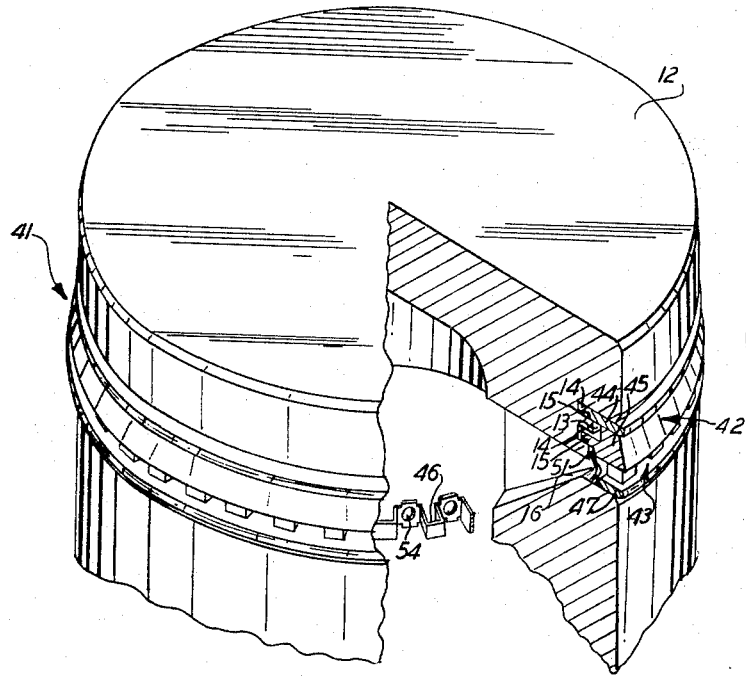
FIGURES 3, 5, 7 and 9 are perspective views, with parts broken away and in section, of pistons and piston ring assemblies showing other embodiments of the invention.
Figure 4:
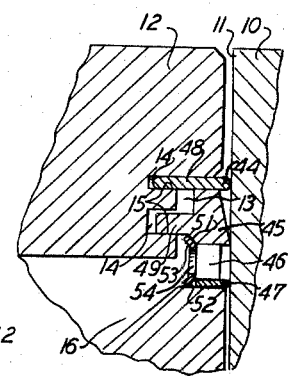
FIGURES 4, 6, 8 and 10 are enlarged cross-sectional views of portions of engine cylinder blocks and pistons and piston ring assemblies illustrating other embodiments of the invention.

A second embodiment of the invention is shown in FIGURES 3 and 4. Piston ring assembly 41, received in ring groove 13, comprises a pressure sealing assembly, shown generally at 42, and an oil control assembly, shown generally at 43.

The pressure sealing elements 42 include rail element 44 and compression element 45. These rings may be of the conventional split ring type. Rail element 44, preferably made of steel, contacts cylinder bore 11 at its radially outward face and has a radially inwardly extending portion 48 which extends into one of annular recesses 14 and overlies one of shelves 15. Compression element 45, positioned axially below rail element 44, contacts cylinder bore 11 at its outer face and has an annular portion 49 which extends radially inwardly into another of annular recesses 14 and overlies another of shelves 15. A conical surface 51 facing radially inwardly and axially downwardly is formed on the underside of compression element 45.

The oil control assembly 43 includes oil control rail 47 situated adjacent the lower side of ring groove 13, and expander-spacer 46, positioned intermediate rail 47 and compression element 45. Expander-spacer 46, biased radially outwardly, is similar to expander-spacer 28 described previously in reference to FIGURES 1 and 2. It has a series of upwardly and radially inwardly extending fingers 53 which engage conical face 51 of compression element 45; similarly, it has a series of downwardly and radially inwardly extending fingers 52 which engage the inner periphery oil control rail 47. A series of holes 54 permits passage of oil through expander-spacer 28 into oil returns 16.

During the engine compression stroke, compression pressure and cylinder bore function urge the piston ring assembly elements axially downwardly causing side sealing of rail element 44 and compression element 45 against the adjacent annular shelves 15 and against the adjacent elements. In addition, rail element 44 and compression element 45, in combination, form a labyrinthian seal to prevent compression loss around the radially inner surfaces of the pressure sealing elements 42.

Similarly to expander-spacer 28 described previously, the radially outward bias of expander-spacer 46 operating through inwardly slanted fingers 52 and 53 against the conical surface 51 and the inner periphery of oil control rail 47 produces a corresponding axial bias tending to wedge apart compression element 45 and rail 47. As the piston descends during power or intake strokes the oil control assembly 43 compresses and oil control rail 44 moves slightly away from the lower side of ring groove 13 to permit oil to pass between enroute to oil return 16. Oil remaining is stripped from bore 11 by the scraper-type surface of compression element 45 and passes through holes 35 enroute to oil return 16.

Figure 6:
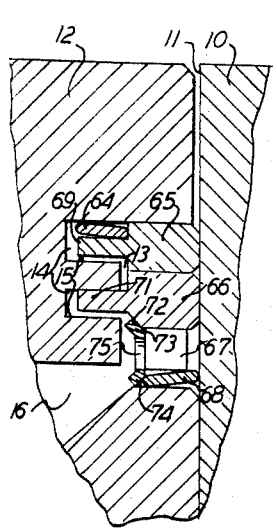
Figure 5:
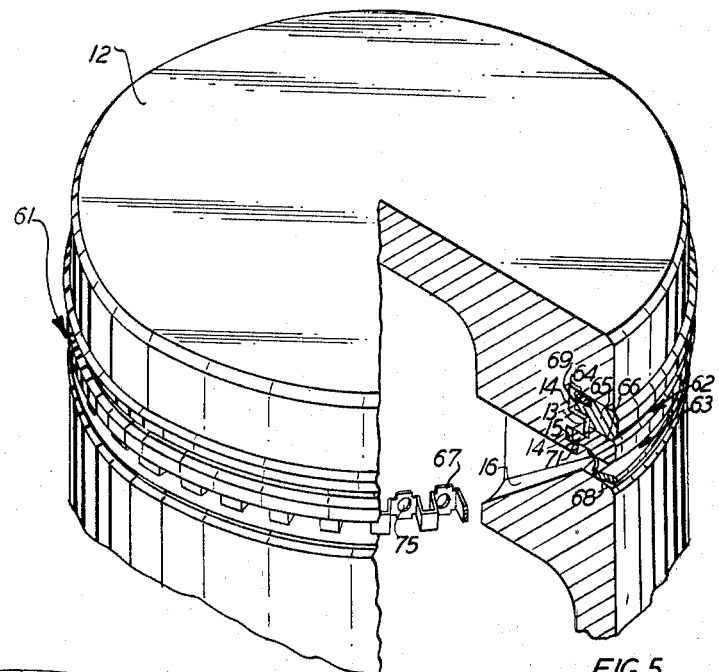

FIGURES 5 and 6 show a third embodiment of the invention. Piston ring assembly 61, received in ring groove 13, comprises a pressure sealing assembly, shown generally at 62, and an oil control assembly, shown generally at 63. The pressure sealing assembly 62, situated axially above oil control assembly 63, includes upper and lower compression elements 65 and 66, respectively, and dished rail element 64. Compression elements, preferably split rings made of cast iron, have essentially T-shaped cross sections with their stem portions extending radially inwardly. The stem portions form annular tongues 69 and 71, each of which extends into one of recesses 14 and overlies one of shelves 15. A conical surface 72 facing radially inwardly and axially downwardly is formed on the underside of compression element 66.

Dished rail element 64, preferably a split ring made of steel, is axially compressed between tongue 69 and the upper side of ring groove 13 and urges compression elements 65 and 66 downwardly towards shelves 15.

Oil control assembly 63 includes oil control rail 68, situated adjacent the lower side of ring groove 13, and expander-spacer 67, positioned intermediate rail 68 and compression element 66. Expander-spacer 67, biased radially outwardly is similar to expander-spacer 28 described previously. It has a series of upwardly and radially inwardly extending slanted fingers 73 which engage conical face 72 of compression element 66; similarly it has a series of downwardly and radially inwardly extending slanted fingers 74 which engage the inner periphery of oil control rail 68. A series of holes 75 permit passage of oil through expander-spacer 28 to oil returns 16.

During the engine compression stroke, compression pressure, cylinder bore friction and the bias force of dished rail element 64 urge the piston ring assembly elements axially downwardly causing side sealing of compression elements 65 and 66 against annular shelves 15 and against the adjacent elements. In addition, dished rail element 64 and compression elements 65 and 66, in combination, form a labyrinthian seal to prevent compression loss around the radially inner surfaces of the pressure sealing assembly 62.

Expander-spacer 67 functions like expander-spacers 28 and 46 to wedge its adjacent elements radially outward against cylinder bore 11 as well as axially apart. The axial flexibility and resiliency of assembly 61 permits the assembly to function as a one way valve allowing oil to return through oil return 16.

Figure 7:
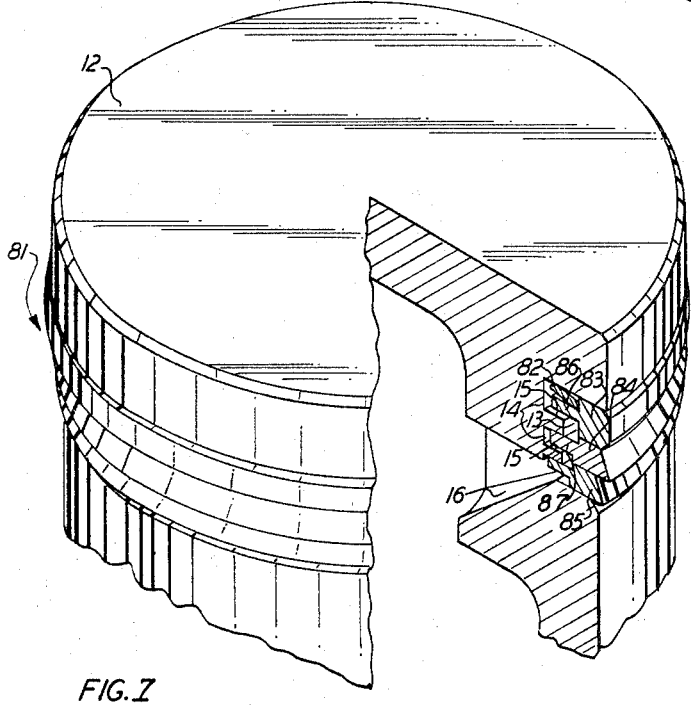
Figure 8:
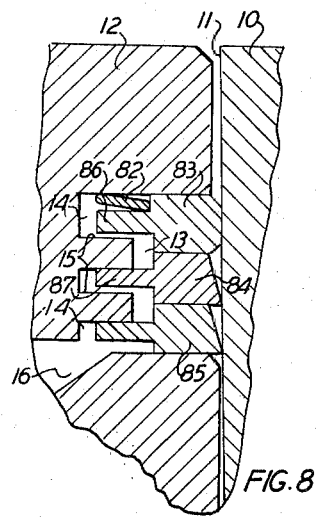

A fourth embodiment of the invention is illustrated in FIGURES 7 and 8. It is a variation of the third embodiment illustrated in FIGURES 5 and 6. Dished rail element 82 and compression elements 83 and 84 are comparable to elements 64, 65 and 66, respectively, of the third embodiment. Likewise, tongue portions 86 and 87 are analogous to portions 69 and 71 of the third embodiment. Instead of an expander-spacer and an oil control rail, compression ring type element 85 is used. The element 85 has an upwardly facing conical outer surface so as to act as a scraper when piston 12 is descending. Assembly 81 has axial flexibility because of dished rail element 82. Thus, upon piston travel the assembly 81 compresses slightly making a space between the lower side of ring groove 13 and the adjacent element 85 to permit oil to pass through enroute to return 16.

Figure 9:
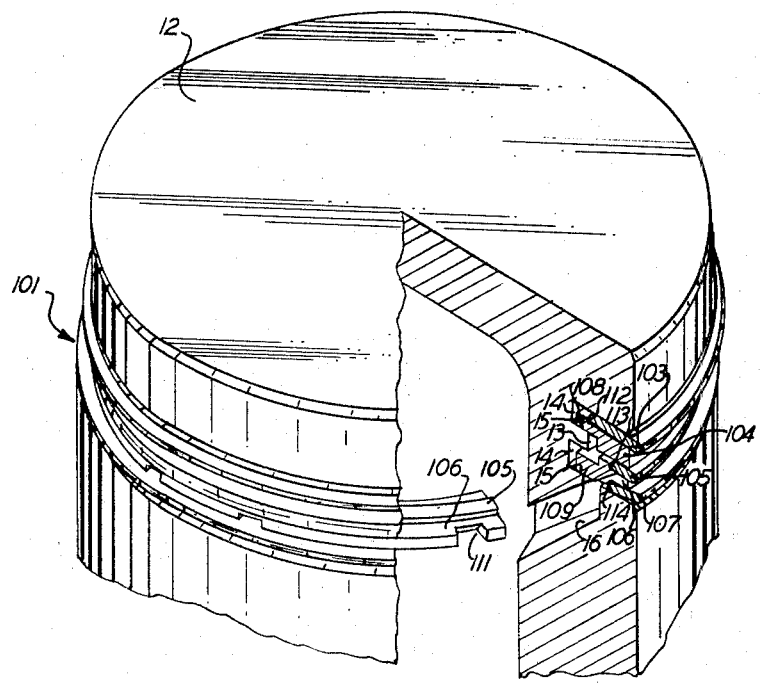
Figure 10:
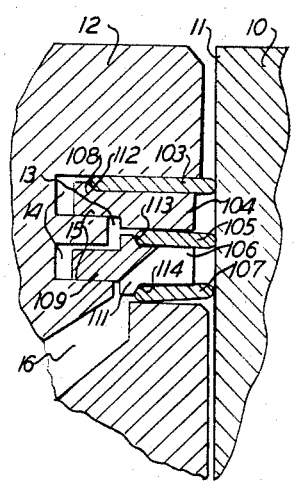

A fifth embodiment of the invention is illustrated in FIGURES 9 and 10. Piston ring assembly 101, received in ring groove 13, comprises rail elements 103, 105 and 107 and spacer elements 104 and 106, positioned axially alternate with the rail elements. Spacer elements 104 and 106, preferably split rings made of cast iron, include portions 108 and 109, respectively, each of which extend radially inwardly into one of annular recesses 14 and overlies one of shelves 15. The radially outer surfaces of spacer elements 104 and 106 are spaced apart from cylinder bore 11. In the upper side of ring 104 is a circular recess forming a conical surface 112 facing radially outwardly and axially upwardly. Likewise, a conical surface 113 is formed in the upper side of spacer 106. Conical surface 114, formed by a circular recess in the underside of spacer 106 faces radially inwardly and axially downwardly. A series of oil passages 111 are formed within spacer 106 permitting oil to pass from the cylinder bore 11 through the spacer 106 to oil return 16.

Rail elements 103, 105 and 107 slidably engage cylinder bore 11 at their outer peripheries and contact conical surfaces 112, 113 and 114 at their inner peripheries. Rail 103 is of greater radial depth than rails 105 and 107.

The radially outward bias of spacers 104 and 106 causes the rail elements 103 and 105 to be wedged radially outwardly and axially upwardly by conical surfaces 112 and 113, respectively. Similarly, oil control rail 107 is wedged axially downwardly and radially outwardly by conical surface 114. The wedge action provides a ring assembly with axial flexibility able to compensate for ring groove waviness. The greater radial depth of rail element 103 assures that portion 108 will seal against the adjacent shelf 15. If compression pressure escapes past the upper side of rail element 103 to the upper of annular recesses 14, it would urge the spacer element 103 radially outwardly. Rail element 103 is then wedged axially upwardly against the upper side of ring groove 13 and spacer element 103 is itself urged downwardly against adjacent shelf 15 to form a tighter seal. In addition, rail elements 103 and 105 and spacer elements 104 and 106, in combination, form a labyrinthian seal to prevent compression loss around the inner surfaces of piston ring assembly 101.

The foregoing description presents presently preferred embodiments of this invention. Modifications and alterations may occur to those skilled in the art that will come within the scope and spirit of the following claims.

What is claimed is:

1. In an internal combustion engine having a cylinder bore slidably receiving a piston therein, said piston having therein an annular piston ring groove, the invention comprising:
   a piston ring assembly cooperating with said ring groove,
   said ring groove having a plurality of inwardly extending annular recesses in the bottom of said ring groove providing a plurality of upwardly facing annular shelves,
   said piston ring assembly having a plurality of pressure sealing elements axially abutting each other, each of said pressure sealing elements having substantially continuous annular contact at an axial side with an adjacent pressure sealing element, and at least two of said pressure sealing elements having outer faces slidably engaging said cylinder bore,
   said piston ring assembly including a biasing element constructed to axially load said piston ring assembly within said ring groove,
   at least two of said elements having inwardly extending annular portions which project into said recesses and overlie said shelves,
   a series of oil return passages communicating from said ring groove to the interior of said piston,
   whereby said piston ring assembly forms a combination oil control and compression ring assembly having a multiple element labyrinthian seal to minimize loss of compression pressure around the radially inner surfaces of said pressure sealing elements and which acts as a one-way valve to permit oil stripped from the cylinder bore to return through said passages and the interior of said piston.

2. A piston ring assembly according to claim 1 and including:
   a number of said pressure sealing elements having upwardly and inwardly slanting, beveled annular faces slidably engaging said cylinder bore.

3. A piston ring assembly according to claim 1 and including:
   one of said pressure sealing elements comprising a rail element,
   another of said pressure sealing elements comprising a relatively wider compression ring element, both of said pressure sealing elements slidably contacting said cylinder bore and having portions which project radially inwardly and overlie said shelves.

4. A piston ring assembly according to claim 3 and including:
   an expander-spacer and an oil control rail positioned axially downwardly from said pressure sealing elements,
   said oil control rail situated adjacent the lower side of said ring groove.

5. A piston ring assembly according to claim 4 and including:
   said expander-spacer having a series of downwardly slanting fingers which bias said oil control rail radially outwardly against said cylinder bore and axially downwardly against the lower side of said ring groove.

6. A piston ring assembly according to claim 1 and including:
   two of said plurality of pressure sealing elements comprising rail elements having portions which extend radially inwardly and overlie said shelves,
   another of said plurality of pressure sealing elements comprising a compression ring element interposing said rail elements,
   said rail elements and said compression ring element slidably engaging said cylinder bore.

7. A piston ring assembly according to claim 6 and including:
   an expander-spacer and a pair of oil control rails positioned axially downwardly from said pressure sealing elements,
   said expander-spacer being interposed between said pair of oil control rails and biasing said rails radially outwardly and axially apart.

8. A piston ring assembly according to claim 7 and including:
   said expander-spacer having a series of upwardly slanting fingers which engage one of said oil control rails and wedge it radially outwardly against said cylinder bore and axially upwardly against the adjacent pressure sealing element,
   said expander-spacer having a series of downwardly slanting fingers which engage the other of said oil control rails and wedge it radially outwardly against said cylinder bore and axially downwardly against the lower side of said ring groove.

9. A piston ring assembly according to claim 1 and including:
   at least two of said pressure sealing elements comprising compression ring elements and at least one of said pressure sealing elements comprising a dished rail element,
   each of said compression ring elements having an inwardly extending annular tongue which projects into one of said channels and overlies one of said shelves,
   each of said compression ring elements having a radially outward face contacting said cylinder bore.

10. A piston ring assembly according to claim 9 and including:

said dished rail element positioned between the upper side of said ring groove and the upper side of the adjacent tongue and resiliently urging said tongues into contact with said shelves.

11. A piston ring assembly according to claim 1 and including:
   at least two of said pressure sealing elements comprising compression ring elements and at least one of said pressure sealing elements comprising a dished rail element,
   each of said compression ring elements having an inwardly extending annular tongue portion which projects into one of said channels and overlies one of said shelves,
   each of said compression ring elements having a radially outward face contacting said cylinder bore,
   an oil control rail and an expander-spacer positioned axially downwardly from said pressure sealing elements,
   said oil control rail slidably engaging said cylinder bore and situated adjacent the lower side of said ring groove.

12. A piston ring assembly according to claim 11 and including:
   the lowermost of said compression ring elements having a beveled, annular shoulder facing radially inwardly and axially downwardly,
   said expander-spacer having a series of downwardly slanting fingers which engage the inner periphery of said oil control rail and wedge it radially outwardly against said cylinder bore and axially downwardly against the lower side of said ring groove,
   said expander-spacer having a series of upwardly slanting fingers which engage said shoulder of said lowermost compression ring element and wedge it radially outwardly against said cylinder bore and axially upwardly against the adjacent pressure sealing element.

13. A piston ring assembly according to claim 1 and including:
   at least two of said pressure sealing elements comprising relatively thin rail elements and at least one of said pressure sealing elements comprising a radially expanding spacer element, said spacer element interposing a pair of said rail elements,
   said rail elements in contact at their outer peripheries with said cylinder bore,
   said spacer element having at least one annular beveled face, said beveled face slidably engaging the inner periphery of the adjacent rail element to wedge said said element radially outwardly and axially away from said spacer element,
   said spacer element having a portion which projects inwardly into one of said channels and overlies one of said shelves.

14. A piston ring assembly according to claim 13 and including:
   the uppermost of said rail elements being adjacent to the upper side of said ring groove and having a greater radial depth than the remainder of said rail elements,
   the lowermost of said rail elements being adjacent the lower side of said ring groove,
   said lowermost rail element being engaged at its inner periphery by said spacer element beveled face and wedged radially outwardly against said cylinder bore and axially downwardly against the lower side of said ring groove.

15. A piston and piston ring assembly according to claim 1 and including:
   one of said pressure sealing elements having an axially downwardly, radially inwardly facing beveled surface portion,
   said biasing element engaging said beveled surface to wedge said one pressure sealing element axially upwardly and radially outwardly.

16. A piston and piston ring assembly according to claim 15 and including:
   said biasing element comprising an expander-spacer having a first series of fingers extending upwardly and inwardly into said ring groove and a second series of fingers extending downwardly and inwardly into said ring groove,
   said first series of fingers engaging said beveled surface,
   said piston ring assembly including an oil rail element adjacent the lower side of said ring groove,
   said second series of fingers engaging said oil rail element to bias it axially downwardly and radially outwardly.

References Cited

UNITED STATES PATENTS

| | | | |
|---|---|---|---|
| 2,052,077 | 8/1936 | Bristow | 277—139 |
| 2,296,116 | 9/1942 | Pelc | 277—178 |
| 1,396,620 | 11/1921 | Bramberry | 277—178 |
| 2,861,852 | 11/1958 | Olsen | 277—138 |
| 3,000,678 | 9/1961 | Braendel | 277—139 |
| 3,024,029 | 3/1962 | Brenneke | 277—139 |
| 3,080,172 | 3/1963 | Mayfield | 277—141 |
| 3,124,364 | 3/1964 | Burns et al. | |
| 3,198,531 | 8/1965 | Brenneke | 277—178 |
| 3,228,704 | 1/1966 | Hamm | 277—138 |
| 3,282,595 | 11/1966 | Hill | 277—143 |

FOREIGN PATENTS 356,943   9/1931   Great Britain.

WENDELL E. BURNS, *Primary Examiner.*